(12) United States Patent
Yusa et al.

(10) Patent No.: US 11,241,816 B2
(45) Date of Patent: Feb. 8, 2022

(54) PROCESS AND DEVICE FOR PRODUCING MOLDED FOAM

(71) Applicant: MAXELL, LTD., Kyoto (JP)

(72) Inventors: Atsushi Yusa, Suita (JP); Satoshi Yamamoto, Nagaokakyo (JP); Hideto Goto, Muko (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/821,372

(22) Filed: Mar. 17, 2020

(65) Prior Publication Data

US 2020/0223122 A1 Jul. 16, 2020

Related U.S. Application Data

(60) Division of application No. 15/850,610, filed on Dec. 21, 2017, now Pat. No. 10,632,663, which is a
(Continued)

(30) Foreign Application Priority Data

Jul. 8, 2015 (JP) .............................. JP2015-136886

(51) Int. Cl.
*B29C 48/53* (2019.01)
*B29C 48/395* (2019.01)
(Continued)

(52) U.S. Cl.
CPC ........ *B29C 48/395* (2019.02); *B29C 44/3446* (2013.01); *B29C 45/10* (2013.01);
(Continued)

(58) Field of Classification Search
CPC ... B29C 48/395; B29C 48/53; B29C 44/3446; B29C 45/10; B29C 45/18; B29C 45/47; B29C 45/422; B29C 45/60
(Continued)

(56) References Cited

U.S. PATENT DOCUMENTS 3,981,649 A * 9/1976 Shimano ............... B29C 48/154
425/4 C
4,344,710 A 8/1982 Johnson et al.
(Continued)

FOREIGN PATENT DOCUMENTS

EP  3 213 898 A1  9/2017
JP  S53-077851 U  6/1978
(Continued)

OTHER PUBLICATIONS

Sep. 20, 2016 Search Report issued in International Patent Application No. PCT/JP2016/070335.
(Continued)

*Primary Examiner* — Jeffrey M Wollschlager
*Assistant Examiner* — Xue H Liu
(74) *Attorney, Agent, or Firm* — Oliff PLC (57) ABSTRACT

An apparatus for producing a foam-molded product, including a plasticizing cylinder which has a plasticization zone for plasticizing and melting a thermoplastic resin into a molten resin and a starvation zone for allowing the molten resin to be in a starved state and which is formed with an introducing port for introducing a physical foaming agent into the starvation zone; and a physical foaming agent supply mechanism which supplies the physical foaming agent to the plasticizing cylinder via the introducing port, wherein the introducing port is open at all times, and the physical foaming agent having a fixed pressure is continuously introduced into the starvation zone from the physical foaming agent supply mechanism via the introducing port during the producing of the foam-molded product.

11 Claims, 4 Drawing Sheets

Related U.S. Application Data continuation of application No. PCT/JP2016/070335, filed on Jul. 8, 2016.

(51) Int. Cl.
| | |
|---|---|
| *B29C 44/34* | (2006.01) |
| *B29C 45/10* | (2006.01) |
| *B29C 45/18* | (2006.01) |
| *B29C 45/47* | (2006.01) |
| *B29C 44/42* | (2006.01) |
| *B29C 44/60* | (2006.01) |
| *B29K 105/04* | (2006.01) |

(52) U.S. Cl.
CPC .............. *B29C 45/18* (2013.01); *B29C 45/47* (2013.01); *B29C 48/53* (2019.02); *B29C 44/422* (2013.01); *B29C 44/60* (2013.01); *B29K 2105/04* (2013.01)

(58) Field of Classification Search
USPC .......................................................... 264/50
See application file for complete search history.

(56) References Cited

U.S. PATENT DOCUMENTS

| | | | |
|---|---|---|---|
| 4,435,453 A | 3/1984 | Vieth et al. | |
| 5,158,986 A | 10/1992 | Cha et al. | |
| 5,234,324 A * | 8/1993 | Kawabata | B29C 44/322 |
| | | | 425/4 C |
| 5,997,781 A | 12/1999 | Nishikawa et al. | |
| 6,435,853 B1 | 8/2002 | Teraoka et al. | |
| 6,616,434 B1 | 9/2003 | Burnham et al. | |
| 6,926,507 B2 | 8/2005 | Cardona et al. | |
| 2002/0017734 A1 | 2/2002 | Sugihara et al. | |
| 2003/0011090 A1 | 1/2003 | Yamaki | |
| 2003/0168766 A1 | 9/2003 | Teraoka et al. | |
| 2005/0006805 A1 | 1/2005 | Sugihara et al. | |
| 2008/0226892 A1 | 9/2008 | Kishbaugh et al. | |
| 2009/0042011 A1 * | 2/2009 | Jaarsma | B29C 44/12 |
| | | | 428/304.4 |
| 2012/0228793 A1 | 9/2012 | Lindenfelzer et al. | |
| 2013/0285273 A1 * | 10/2013 | Yusa | B29C 48/834 |
| | | | 264/50 |

FOREIGN PATENT DOCUMENTS

| | | |
|---|---|---|
| JP | S58-036423 A | 3/1983 |
| JP | 2625576 B2 | 7/1997 |
| JP | 2001-009882 A | 1/2001 |
| JP | 2001-341152 A | 12/2001 |
| JP | 2002-079545 A | 3/2002 |
| JP | 2003-191272 A | 7/2003 |
| JP | 2004-25465 A | 1/2004 |
| JP | 2004-237522 A | 8/2004 |
| JP | 2004-322341 A | 11/2004 |
| JP | 2006-56265 A | 3/2006 |
| JP | 3788750 B2 | 6/2006 |
| JP | 4144916 B2 | 9/2008 |
| JP | 2013-107402 A | 6/2013 |
| JP | 2014-213570 A | 11/2014 |
| WO | 01/091987 A1 | 12/2001 |

OTHER PUBLICATIONS

Feb. 14, 2017 Office Action issued in Japanese Patent Application No. 2016-567053.
May 8, 2017 Office Action issued in Japanese Patent Application No. 2017-038691.
Sep. 20, 2016 Written Opinion of the International Searching Authority issued in International Patent Application No. PCT/JP2016/070335.
Jul. 27, 2018 Office Action issued in U.S. Appl. No. 15/850,610.
Nov. 14, 2018 Office Action issued in U.S. Appl. No. 15/850,610.
Feb. 5, 2019 Search Report issued in European Application No. 16821500.2.
May 2, 2019 Office Action issued in U.S. Appl. No. 15/850,610.

* cited by examiner

PROCESS AND DEVICE FOR PRODUCING MOLDED FOAM

CROSS REFERENCE TO RELATED APPLICATION

This application is a Division of application Ser. No. 15/850,610 filed Dec. 21, 2017, which in turn is a Continuation Application of International Application No. PCT/JP2016/070335 which was filed on Jul. 8, 2016 claiming the conventional priority of Japanese patent Application No. 2015-136886 filed on Jul. 8, 2015. The disclosure of the prior applications is hereby incorporated by reference herein in its entirety.

BACKGROUND OF THE INVENTION

Field of the Invention

The present invention relates to a method (process) and an apparatus (device) for producing a foamed molded product (foam-molded product or molded foam).

Description of the Related Art

In recent years, an injection foam molding method, which uses nitrogen or carbon dioxide in the supercritical state as a physical foaming agent, is researched and practically used (Patent Document 1: Japanese Patent No. 2625576 which corresponds to U.S. Pat. No. 5,158,986, Patent Document 2: Japanese Patent No. 3788750, and Patent Document 3: Japanese Patent No. 4144916 which corresponds to U.S. Pat. No. 5,997,781). According to Patent Documents 1 to 3, the injection foam molding method, which uses the physical foaming agent, is performed as follow. At first, the physical foaming agent is introduced into a hermetically closed plasticizing cylinder, and the physical foaming agent is brought in contact with and dispersed in a plasticized and melted (molten) resin. The molten resin, in which the physical foaming agent is dispersed, is weighed or metered, and the molten resin is injected and charged into a mold, while maintaining a high pressure in the plasticizing cylinder to such an extent that the physical foaming agent is in the supercritical state. The supercritical fluid, which has been compatibly dissolved in the molten resin, is subjected to the sudden pressure reduction during the injection charging, and the supercritical fluid is gasified. The molten resin is solidified, and thus foams or bubbles (foam cells) are formed at the inside of a molded product. In the injection foam molding method as described above, the physical foaming agent is weighed at a pressure which is slightly higher than the internal pressure of the resin. After the weighing, the physical foaming agent is introduced into the plasticizing cylinder. Therefore, the amount of dissolution of the physical foaming agent in the molten resin is determined by the amount of introduction of the physical foaming agent (introduction amount control).

Further, Patent Document 4 (Japanese Patent Application Laid-open No. 2013-107402 which corresponds to U.S. Patent Application Publication No. 2013/0285273) discloses an injection foam molding method based on the use of a physical foaming agent, wherein a part of the physical foaming agent, which is contained in a molten resin, is separated during the molding, and the part of the physical foaming agent is discharged to the outside of a plasticizing cylinder (kneading apparatus) in this method. In Patent Document 4, the kneading apparatus is disclosed, which is formed with a vent for discharging the physical foaming agent and which has a mechanism for retaining a fixed pressure (constant pressure) of an area (pressure reduction zone) formed with the vent. According to this method, the amount of dissolution of the physical foaming agent in the molten resin is determined by the pressure of a back pressure valve in the pressure reduction zone (pressure control). Therefore, it is unnecessary to correctly control the amount of pouring of the physical foaming agent into the plasticizing cylinder unlike the technique as disclosed in Patent Documents 1 to 3 described above.

Patent Documents 5 and 6 (Patent Document 5: Japanese Patent Application Laid-open No. 2001-341152, and Patent Document 6: Japanese Patent Application Laid-open No. 2004-237522) also disclose an injection foam molding method based on the use of a physical foaming agent, wherein the physical foaming agent is introduced into a plasticizing cylinder in accordance with the pressure control in this method. In the case of Patent Documents 5 and 6, a starvation zone, which is unfulfilled with the molten resin, is provided in the plasticizing cylinder, and the physical foaming agent is introduced into the starvation zone.

A production apparatus, which is disclosed in Patent Documents 5 and 6, has such a structure that the inner diameter of an introducing port for introducing the physical foaming agent is small, and the introducing port is opened intermittently by a check valve or the like, in the same manner as the conventional and general production apparatus. The reason, why the conventional production apparatus, which uses the physical foaming agent, has the structure as described above, is as follows. In the first place, when the physical foaming agent is introduced into the plasticizing cylinder, a harmful influence arises such that the temperature of the physical foaming agent is suddenly raised on account of the contact with the molten resin having a high temperature, and the amount of introduction of the physical foaming agent becomes unstable. On this account, in the case of the conventional production apparatus, the flow passage for the physical foaming agent is narrowed to be thin in order to control the flow rate of the physical foaming agent so that it is intended to stabilize the amount of introduction. In the second place, if the molten resin flows backwardly in the flow passage which is thin as described above, it is feared that the flow passage may be immediately clogged up and the flow passage may malfunction. On this account, the introducing port for introducing the physical foaming agent is not normally open. Such a structure is adopted that the check valve or the like is provided to intermittently open the introducing port.

In the case of the injection foam molding method based on the use of the physical foaming agent as described in Patent Documents 1 to 3, if the concentration of the physical foaming agent is high in the molten resin, it is feared that the molten resin and the physical foaming agent may cause the phase separation. On this account, it has been necessary that the concentration of the physical foaming agent should be lowered to about $1/5$ to $1/10$ of the saturated solubility. Then, in order that a large number of foaming nuclei are formed during the injection charging into the mold while allowing the concentration of the physical foaming agent in the molten resin to be at the low ratio with respect to the saturated solubility, it has been necessary that the physical foaming agent to be introduced into the plasticizing cylinder should be set to have a high pressure and the amount of introduction should be correctly weighed. This results in the main cause or primary factor to complicate the supply mechanism for supplying the physical foaming agent and raise the initial cost of the apparatus.

On the other hand, in the case of the injection foam molding method based on the use of the physical foaming agent as described in Patent Document 4, the kneading apparatus, which is adopted as described above, makes it possible to raise the concentration of the physical foaming agent in the molten resin to a concentration approximate to the saturated solubility (saturated concentration) after discharging the part of the physical foaming agent, wherein it is possible to form a large number of foaming nuclei by using the physical foaming agent having a relatively low pressure. However, the injection foam molding method described in Patent Document 4 involves a seal mechanism which shuts off the pressure reduction zone from other zones by reversely rotating a screw in order to retain a fixed pressure in the pressure reduction zone. On this account, problems arise, for example, such that the screw is lengthened, and the plasticizing weighing time is prolonged because the screw is reversely rotated.

In the case of the injection foam molding method as described in Patent Documents 5 and 6, the physical foaming agent is introduced into the plasticizing cylinder in accordance with the pressure control. Therefore, it is unnecessary to correctly weigh the amount of introduction of the physical foaming agent. Further, it is not necessarily indispensable to provide the seal mechanism as disclosed in Patent Document 4. However, according to the investigation performed by the present inventors, when the physical foaming agent is intermittently introduced into the starvation zone in the plasticizing cylinder as disclosed in Patent Documents 5 and 6, the pressure varies or fluctuates in the starvation zone. As a result, it is feared that the amount of dissolution (amount of permeation) of the physical foaming agent with respect to the molten resin cannot be controlled accurately.

It is speculated that the main cause thereof is the insufficient amount of introduction of the physical foaming agent, because the physical foaming agent is intermittently introduced into the plasticizing cylinder. However, as described above, there are the problem of the difference in temperature between the introduced physical foaming agent and the molten resin and the problem of the backward flow of the molten resin. Therefore, it has been difficult to increase the amount of introduction of the physical foaming agent and contemplate the stabilization by using the apparatus having the structure as disclosed in Patent Documents 5 and 6.

The present teaching solves the problems described above. The present teaching provides a method for producing a foam-molded product which makes it possible to omit or simplify the complicated control device for the physical foaming agent and which makes it possible to stabilize the amount of dissolution (amount of permeation) of the physical foaming agent with respect to the molten resin by a simple mechanism.

SUMMARY OF THE INVENTION

According to a first aspect of the present teaching, there is provided a method for producing a foam-molded product (foamed molded product) by using a plasticizing cylinder which has a plasticization zone for plasticizing and melting a thermoplastic resin into a molten resin and a starvation zone for allowing the molten resin to be in a starved state and which is formed with an introducing port for introducing a physical foaming agent into the starvation zone; the method including plasticizing and melting the thermoplastic resin to provide the molten resin in the plasticization zone; allowing the molten resin to be in the starved state in the starvation zone; introducing a pressurized fluid containing the physical foaming agent having a fixed pressure into the starvation zone to retain the starvation zone at the fixed pressure; bringing the molten resin in the starved state in contact with the pressurized fluid containing the physical foaming agent having the fixed pressure in the starvation zone in a state in which the starvation zone is retained at the fixed pressure; and molding the molten resin having been brought in contact with the pressurized fluid containing the physical foaming agent into the foam-molded product.

In the modes of the present teaching, the molten resin may be pressurized with the pressurized fluid containing the physical foaming agent in the starvation zone. The starvation zone may be constantly at the fixed pressure during the production of the foam-molded product. The physical foaming agent, which is brought in contact with the molten resin, may permeate into the molten resin. Further, the fixed pressure may be 1 MPa to 15 MPa.

The plasticizing cylinder may have a compression zone and the starvation zone which are provided adjacently in this order from an upstream side in a flow direction of the molten resin; and a mechanism for raising a flow resistance of the molten resin may be provided in the compression zone so that a pressure of the molten resin may be thereby raised in the compression zone and the molten resin may be in the starved state in the starvation zone. An inner diameter of the introducing port may be 20% to 100% of an inner diameter of the plasticizing cylinder. The introducing port may be open at all times.

The plasticizing cylinder may have an introducing speed adjusting container connected to the introducing port; the method may further include supplying the pressurized fluid containing the physical foaming agent to the introducing speed adjusting container; and the pressurized fluid containing the physical foaming agent having the fixed pressure may be introduced into the starvation zone from the introducing speed adjusting container. A volume of the introducing speed adjusting container may be 5 mL to 10 L. Further, the method according to the mode of the present teaching may further include detecting expansion of the molten resin from the introducing port; and stopping driving of the plasticizing cylinder in a case that the expansion of the molten resin from the introducing port is detected.

According to a second aspect of the present teaching, there is provided an apparatus for producing a foam-molded product (foamed molded product); including a plasticizing cylinder which has a plasticization zone for plasticizing and melting a thermoplastic resin into a molten resin and a starvation zone for allowing the molten resin to be in a starved state and which is formed with an introducing port for introducing a physical foaming agent into the starvation zone; an introducing speed adjusting container which is connected to the introducing port; and a physical foaming agent supply mechanism which is connected to the introducing speed adjusting container and which supplies the physical foaming agent to the plasticizing cylinder via the introducing speed adjusting container; wherein a pressurized fluid containing the physical foaming agent having a fixed pressure is introduced into the starvation zone, the starvation zone is retained at the fixed pressure; the molten resin in the starved state is brought in contact with the pressurized fluid containing the physical foaming agent having the fixed pressure in the starvation zone in a state in which the starvation zone is retained at the fixed pressure; and the molten resin having been brought in contact with the pressurized fluid containing the physical foaming agent is molded into the foam-molded product.

In the modes of the present teaching, an inner diameter of the introducing port may be 20% to 100% of an inner diameter of the plasticizing cylinder; and a volume of the introducing speed adjusting container may be 5 mL to 10 L. Further, the introducing speed adjusting container may be provided with an expansion detecting mechanism which detects expansion of the molten resin from the introducing port.

DESCRIPTION OF THE PREFERRED EMBODIMENT

An explanation will be made about the method for producing the foamed molded product of the embodiment of the present teaching with reference to the flow chart shown in FIG. 1.

(1) Apparatus for Producing Foamed Molded Product

Figure 2:
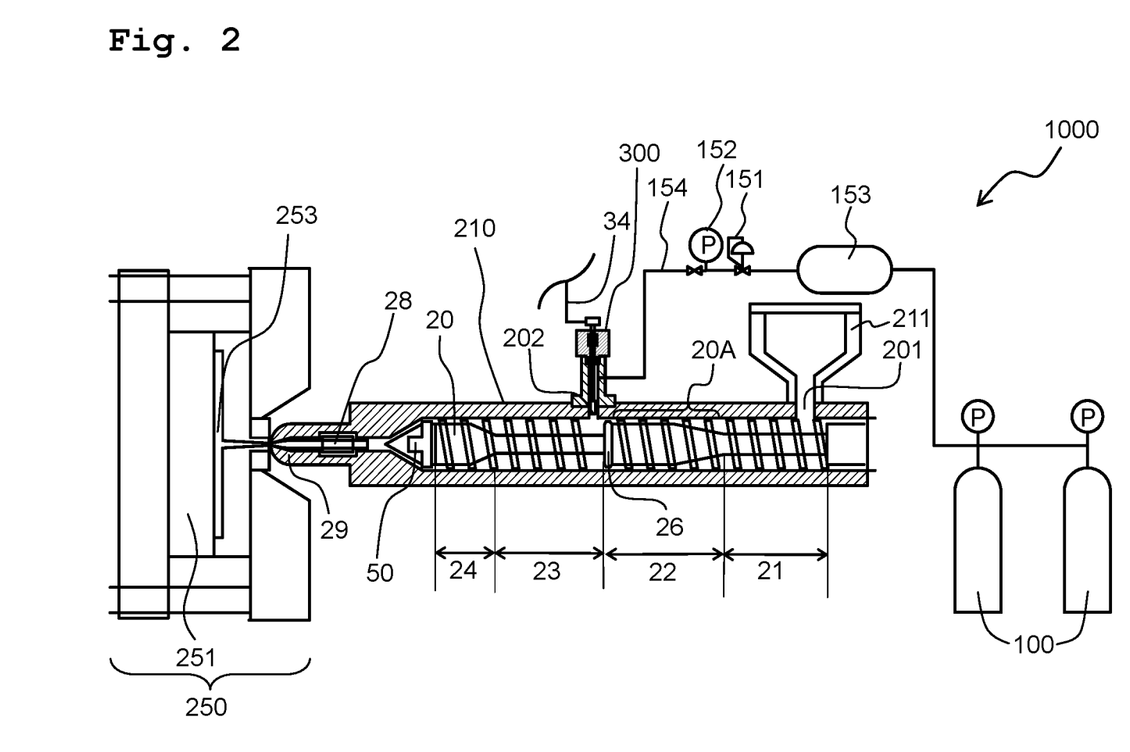
FIG. 2 shows an apparatus for producing the foamed molded product used in the embodiment.

At first, an explanation will be made about an apparatus (a production apparatus) for producing the foamed molded product used in the embodiment of the present teaching. In the embodiment of the present teaching, the foamed molded product is produced by using the production apparatus (injection molding apparatus) 1000 shown in FIG. 2. The production apparatus 1000 principally includes a plasticizing cylinder 210 which includes a screw 20 provided internally, a bomb 100 which serves as a physical foaming agent supply mechanism for supplying a physical foaming agent to the plasticizing cylinder 210, a clamping unit 250 which is provided with a mold 251, and a control device (controller) (not shown) which is provided to control the operations of the plasticizing cylinder 210 and the clamping unit 250. A molten resin, which is plasticized and melted in the plasticizing cylinder 210, flows from the right to the left as viewed in FIG. 2. Therefore, at the inside of the plasticizing cylinder 210 of the embodiment of the present teaching, the right as viewed in FIG. 2 is defined as "upstream" or "backward", and the left is defined as "downstream" or "frontward".

The plasticizing cylinder has a plasticization zone 21 in which a thermoplastic resin is plasticized and melted into the molten resin, and a starvation zone 23 disposed on the downstream side of the plasticization zone 21, in which the molten resin is in the starved state. The "starved state" is a state in which the interior of the starvation zone 23 is not fulfilled with the molten resin and the interior of the starvation zone 23 is unfulfilled. Therefore, the space other than the portion occupied by the molten resin exists in the starvation zone 23. Further, an introducing port 202, which is provided to introduce the physical foaming agent into the starvation zone 23, is formed. An introducing speed adjusting container 300 is connected to the introducing port 202. The bomb 100 supplies the physical foaming agent to the plasticizing cylinder 210 via the introducing speed adjusting container 300.

Note that the production apparatus 1000 has only one starvation zone 23.

Figure 3:
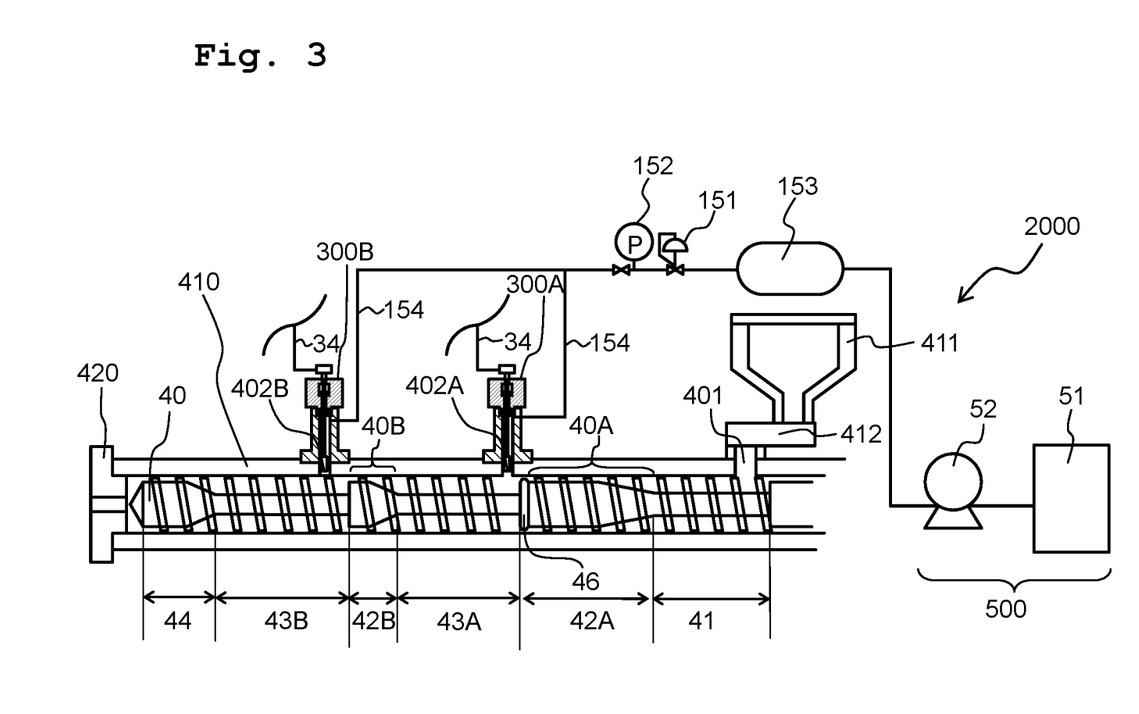
FIG. 3 shows an apparatus for producing a foamed molded product used in Example 4.

However, the production apparatus, which is usable for the embodiment of the present teaching, is not limited thereto. For example, in order to facilitate the permeation of the physical foaming agent into the molten resin, it is also allowable to adopt such a structure that a plurality of starvation zones 23 and a plurality of introducing ports 202 formed therefore are provided, and the physical foaming agent is introduced into the plasticizing cylinder 210 from the plurality of introducing ports 202. Further, the production apparatus 1000 is the injection molding apparatus. However, the production apparatus, which is usable for the embodiment of the present teaching, is not limited thereto. For example, it is also allowable to use an extrusion molding apparatus 2000 as shown in FIG. 3. Details of the extrusion molding apparatus 2000 will be described later on in Example 4.

(2) Method for Producing Foamed Molded Product

Figure 1:
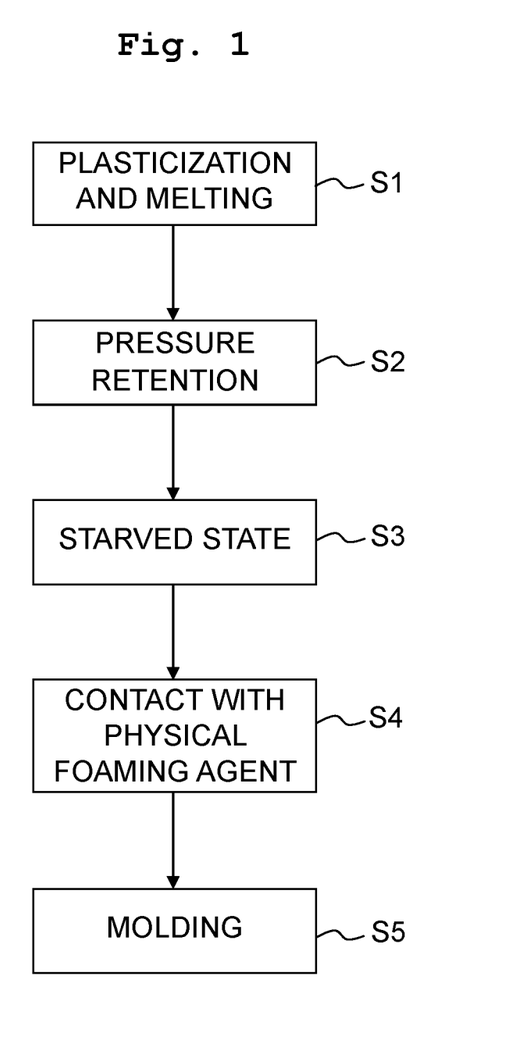
FIG. 1 shows a flow chart illustrating a method for producing a foamed molded product according to an embodiment.

At first, the thermoplastic resin is plasticized and melted to provide the molten resin in the plasticization zone 21 of the plasticizing cylinder 210 (Step S1 shown in FIG. 1). As for the thermoplastic resin, it is possible to use various resins depending on the type of the objective molded product. Specifically, it is possible to use, for example, thermoplastic resins such as polypropylene, polymethyl methacrylate, polyamide, polycarbonate, amorphous polyolefin, polyether imide, polyethylene terephthalate, polyether ether ketone, ABS resin (acrylonitrile butadiene styrene copolymer resin), polyphenylene sulfide, polyamide imide, polylactic acid, polycaprolactone and the like, and composite materials thereof. These thermoplastic resins may be used singly, or they may be used by mixing two or more. It is also possible to use those obtained by kneading, in the thermoplastic resins, various inorganic fillers such as glass fibers, talc, carbon fibers and the like. It is preferable that the thermoplastic resin is mixed with an inorganic filler which functions as a foaming nucleating agent and/or an additive which increases the melt tension. When the materials as described above are mixed with each other, it is thereby possible to obtain fine foam cells. The thermoplastic resin of the embodiment of the present teaching may contain various general purpose additives other than the above, if necessary.

In the embodiment of the present teaching, the thermoplastic resin is plasticized and melted in the plasticizing cylinder 210 including the screw 20 provided internally as shown in FIG. 2. A band heater (not shown) is arranged on an outer wall surface of the plasticizing cylinder 210, and the plasticizing cylinder 210 is heated thereby. Further, the shearing heat generated by the rotation of the screw 20 is also added, and thus the thermoplastic resin is plasticized and melted.

In the next place, the physical foaming agent having a fixed pressure (constant pressure or given pressure) is introduced into the starvation zone 23, and the starvation zone 23 is retained at the fixed pressure (Step S2 shown in FIG. 1).

A pressurized fluid is used as the physical foaming agent. In the embodiment of the present teaching, the "fluid" means any one of liquid, gas, and supercritical fluid. Further, the physical foaming agent is preferably, for example, carbon dioxide or nitrogen in view of the cost and the load on the environment. In the embodiment of the present teaching, the pressure of the physical foaming agent is relatively low. Therefore, for example, it is possible to use the fluid taken out from the bomb stored with the fluid including, for example, a nitrogen bomb, a carbon dioxide bomb, and an air bomb, while the pressure is reduced to provide the fixed pressure by a pressure reducing valve. In this case, it is unnecessary to use any pressure-raising apparatus. Therefore, it is possible to reduce the cost of the entire production apparatus. Further, the fluid, for which the pressure is raised to a predetermined pressure, may be used as the physical foaming agent, if necessary. For example, when nitrogen is used as the physical foaming agent, the physical foaming agent can be produced by the following method. At first, the air of the atmospheric air is allowed to pass through a nitrogen separation membrane while compressing the air by a compressor so that nitrogen is purified. Subsequently, the pressure of purified nitrogen is raised to the predetermined pressure by using, for example, a booster pump or a syringe pump, and thus the physical foaming agent is produced.

The pressure of the physical foaming agent introduced into the starvation zone 23 is fixed or constant. The pressure of the starvation zone 23 is retained at the fixed pressure which is the same as that of the physical foaming agent to be introduced. The pressure of the physical foaming agent is preferably 1 MPa to 15 MPa, more preferably 2 MPa to 10 MPa, and much more preferably 2 MPa to 8 MPa. The optimum pressure differs depending on the type of the molten resin. However, when the pressure of the physical foaming agent is not less than 1 MPa, it is thereby possible to permeate, into the molten resin, the physical foaming agent in an amount required to cause the foaming. When the pressure of the physical foaming agent is not more than 15 MPa, it is thereby possible to reduce the load on the apparatus. Note that the phrase that the pressure of the physical foaming agent for pressurizing the molten resin is "fixed" or "constant" means that the range of fluctuation of the pressure with respect to the predetermined pressure is preferably within ±10% and more preferably within ±5%. The pressure of the starvation zone is measured, for example, by a pressure sensor (not shown) provided at a position opposed to the introducing port 202 of the plasticizing cylinder 210.

In the embodiment of the present teaching, as shown in FIG. 2, the physical foaming agent is fed from the bomb 100, and the physical foaming agent is supplied from the introducing port 202 into the starvation zone 23 via the introducing speed adjusting container 300. The pressure of the physical foaming agent is reduced to the predetermined pressure by using a pressure reducing valve 151, and then the physical foaming agent is introduced into the starvation zone 23 from the introducing port 202 without passing through, for example, a pressure raising apparatus. In the embodiment of the present teaching, for example, the time of introduction and the amount of introduction of the physical foaming agent introduced into the plasticizing cylinder 210 are not controlled. Therefore, it is unnecessary to provide any mechanism for controlling them, for example, a driving valve based on the use of, for example, a check valve and/or a solenoid-operated valve. The introducing port 202 has no driving valve, and the introducing port 202 is always or normally open (open at all times). In the embodiment of the present teaching, the area, which ranges from the pressure reducing valve 151 via the introducing speed adjusting container 300 to the starvation zone 23 in the plasticizing cylinder 210, is retained at the fixed pressure of the physical foaming agent by the physical foaming agent supplied from the bomb 100.

The introducing port 202 for the physical foaming agent has an inner diameter which is larger than that of an introducing port for the physical foaming agent of any conventional production apparatus. On this account, even in the case of the physical foaming agent having a relatively low pressure, the physical foaming agent can be efficiently introduced into the plasticizing cylinder 210. Further, even when a part of the molten resin is solidified by being brought in contact with the introducing port 202, the introducing port 202 can function as the introducing port without being completely clogged up, because the inner diameter is large. On the other hand, if the inner diameter of the introducing port 202 is excessively large, the staying of the molten resin arises, which causes any defective molding. Further, the introducing speed adjusting container 300, which is connected to the introducing port 202, is large-sized, and the cost of the entire apparatus is increased. Specifically, the inner diameter of the introducing port 202 is preferably 20% to 100% of the inner diameter of the plasticizing cylinder 210 and more preferably 30% to 80% of the inner diameter of the plasticizing cylinder 210. Alternatively, the inner diameter of the introducing port 202 is preferably 3 mm to 100 mm and more preferably 5 mm to 50 mm, without depending on the inner diameter of the plasticizing cylinder 210.

The introducing speed adjusting container 300, which is connected to the introducing port 202, has a volume which is not less than a certain value. Accordingly, it is possible to obtain a slow or gentle flow rate of the physical foaming agent introduced into the plasticizing cylinder 210, and it is possible to secure the time for enabling the physical foaming agent to stay in the introducing speed adjusting container 300. When the physical foaming agent stays in the vicinity of the heated plasticizing cylinder 210, the physical foaming agent is thereby heated or warmed. The difference in temperature between the physical foaming agent and the molten resin is decreased, and it is possible to stabilize the amount of dissolution (amount of permeation) of the physical foaming agent into the molten resin. That is, the introducing speed adjusting container 300 functions as a buffer container. On the other hand, if the volume of the introducing speed adjusting container 300 is excessively large, the cost of the entire apparatus is increased. Although depending on the amount of the molten resin existing in the starvation zone 23, the volume of the introducing speed adjusting container 300 is preferably 5 mL to 10 L and more preferably 10 mL to 1 L. When the volume of the introducing speed adjusting container 300 is within this range, it is possible to secure the time for enabling the physical foaming agent to stay while taking the cost into consideration.

Further, as described later on, the physical foaming agent is brought in contact with the molten resin, and the physical foaming agent permeates thereinto. Thus, the physical foaming agent is consumed in the plasticizing cylinder 210. In order to retain the fixed pressure of the starvation zone 23, the physical foaming agent, which corresponds to the consumed amount, is introduced into the starvation zone 23 from the introducing speed adjusting container 300. If the volume of the introducing speed adjusting container 300 is excessively small, then the frequency of replacement of the physical foaming agent is raised, and hence the temperature of the physical foaming agent becomes unstable. As a result, it is feared that the supply of the physical foaming agent may become unstable. Therefore, it is preferable that the introducing speed adjusting container 300 has such a volume that the physical foaming agent, which corresponds to the amount consumed in the plasticizing cylinder for 1 minute to 10 minutes, can stay.

Note that the introducing speed adjusting container 300 may be a container which is an individual distinct from the plasticizing cylinder 210. Alternatively, the introducing speed adjusting container 300 may be formed integrally with the plasticizing cylinder 210, and the introducing speed adjusting container 300 may constitute a part of the plasticizing cylinder 210. Further, in the embodiment of the present teaching, only the physical foaming agent is introduced into the starvation zone 23. However, another pressurized fluid other than the physical foaming agent may be simultaneously introduced into the starvation zone 23 to such an extent that the effect of the present teaching is not affected thereby. In this case, the pressurized fluid containing the physical foaming agent, which is introduced into the starvation zone 23, has the fixed pressure described above.

In the next place, the molten resin is allowed to flow to the starvation zone 23, and the molten resin is allowed to be in the starved state in the starvation zone 23 (Step S3 shown in FIG. 1). The starved state is determined by the balance between the feed amount of the molten resin fed from the upstream of the starvation zone 23 to the starvation zone 23 and the feed amount of the molten resin fed from the starvation zone 23 to the downstream thereof. If the former is smaller, the starved state is given.

In the embodiment of the present teaching, the molten resin is allowed to be in the starved state by a method explained below. The plasticizing cylinder 210 used in the embodiment of the present teaching has a compression zone 22 which is arranged adjacently to the starvation zone 23 on the upstream from the starvation zone 23, wherein the molten resin is compressed to raise the pressure. The compression zone 22 is provided with a large diameter portion 20A in which the diameter of the shaft of the screw 20 is larger (thicker) than that of the plasticization zone 21 positioned on the upstream side and the screw flight is shallowed in a stepwise manner. Further, a ring 26 is provided at the boundary with respect to the starvation zone 23. The ring 26 has a half-divided structure, and the ring 26 is installed by covering the screw 20 with the parts thereof divided into two. When the diameter of the shaft of the screw is increased, then the clearance between the screw 20 and the inner wall of the plasticizing cylinder 210 is decreased, and it is possible to reduce the supply amount of the resin fed to the downstream. Therefore, it is possible to raise the flow resistance of the molten resin. Further, the flow resistance of the molten resin can be also raised in the same manner as described above by providing the ring 26 for the screw 20. Therefore, in the embodiment of the present teaching, the large diameter portion 20A and the ring 26 are the mechanisms for raising the flow resistance of the molten resin.

Owing to the presence of the large diameter portion 20A and the ring 26, the flow rate of the resin supplied from the compression zone 22 to the starvation zone 23 is lowered. The molten resin is compressed in the compression zone 22 disposed on the upstream side, and the pressure is raised. The starvation zone 23 disposed on the downstream side is unfulfilled with the molten resin (starved state). In order to facilitate the starved state of the molten resin, the screw 20 has the following structure. That is, the diameter of the shaft is small (thin) at the portion positioned in the starvation zone 23, i.e., the portion disposed on the downstream side of the ring 26, and the screw flight is deep, as compared with the portion positioned in the compression zone 22, i.e., the portion disposed on the upstream side from the ring 26. Further, it is preferable that the screw 20 has the following structure. That is, the diameter of the shaft is small (thin) and the screw flight is deep over the entire starvation zone 23, as compared with the portion positioned in the compression zone 22. Further, it is preferable that the diameter of the shaft of the screw 20 and the depth of the screw flight are substantially constant over the entire starvation zone 23.

Accordingly, it is possible to retain the substantially fixed pressure in the starvation zone 23, and it is possible to stabilize the starved state of the molten resin. In the embodiment of the present teaching, as shown in FIG. 2, the starvation zone 23 is formed at the portion disposed downstream from the ring 26, at which the diameter of the shaft of the screw 20 and the depth of the screw flight are constant in relation to the screw 20.

The mechanism, which is provided in the compression zone 22 and which raises the flow resistance of the molten resin, is not specifically limited, provided that the mechanism temporarily reduces the flow passage area for allowing the molten resin to pass in order to restrict the flow rate of the resin supplied from the compression zone 22 to the starvation zone 23. In the embodiment of the present teaching, both of the large diameter portion 20A of the screw and the ring 26 are used. However, only one of them may be used. Other than the large diameter portion 20A of the screw and the ring 26, the mechanism for raising the flow resistance is exemplified, for example, by a structure in which the screw flight is provided in an opposite direction as compared with other portions and a labyrinth structure which is provided on the screw.

The mechanism for raising the flow resistance of the molten resin may be provided for the screw, for example, as the ring which is the member distinct from the screw. Alternatively, the mechanism may be provided integrally with the screw as a part of the structure of the screw. When the mechanism for raising the flow resistance of the molten resin is provided, for example, as the ring which is the member distinct from the screw, the size of the clearance portion as the flow passage for the molding method can be changed by changing the ring. Therefore, an advantage is obtained such that the magnitude of the flow resistance of the molten resin can be changed with ease.

Further, other than the mechanism for raising the flow resistance of the molten resin, the molten resin can be also in the starved state in the starvation zone 23 such that a counter flow preventing mechanism (seal mechanism), which prevents the molten resin from the counter flow from the starvation zone 23 to the upstream compression zone 22, is provided at the boundary of the compression zone 22 with respect to the starvation zone 23. For example, it is possible to exemplify the seal mechanism including, for example, a steel ball or a ring which is movable to the upstream side in accordance with the pressure of the physical foaming agent. However, the counter flow preventing mechanism requires a driving portion, and hence it is feared that the resin may stay. On this account, it is preferable to use the mechanism for raising the flow resistance having no driving portion.

In the embodiment of the present teaching, in order to stabilize the starved state of the molten resin in the starvation zone 23, it is also appropriate to control the supply amount of the thermoplastic resin supplied to the plasticizing cylinder 210, for the following reason. That is, if the supply amount of the thermoplastic resin is excessively large, it is difficult to maintain the starved state. For example, the supply amount of the thermoplastic resin is controlled by using a general purpose feeder screw.

Further, the method of the embodiment of the present teaching may include detecting expansion of the molten resin from the introducing port 202, and stopping driving of the production apparatus 1000 including the plasticizing cylinder 210 when the expansion of the molten resin from the introducing port 202 is detected. As for the starvation zone 23, the flight of the screw 20 is deep, and the amount of the accumulated resin is small. Therefore, even when the inner diameter of the introducing port 202 is large, the molten resin scarcely expands from the introducing port 202. However, due to the reason described below, it is preferable that the molding apparatus 1000 of the embodiment of the present teaching is provided with an expansion detecting mechanism which detects the expansion of the molten resin from the introducing port 202. In order to maintain the starved state of the molten resin in the starvation zone 23, it is necessary that the difference, which is not less than a certain extent, should be provided between the fluidity (easiness to flow) of the resin in the compression zone 22 and the fluidity in the starvation zone 23. In order to obtain the difference in the fluidity, it is necessary to optimize, for example, the amount of the molten resin supplied to the compression zone 22, the outer diameter of the ring 26 which serves as the flow resistance, and the weighing condition. Once any stable molding condition is found out, it is possible to perform the stable molding. However, it is feared that the molten resin may expand from the introducing port 202 until arrival at the optimum molding condition. Therefore, especially when the foamed molded product is mass-produced, it is preferable that the production condition is optimized by using a molding machine provided with the expansion detecting mechanism before the mass production.

Figure 4:
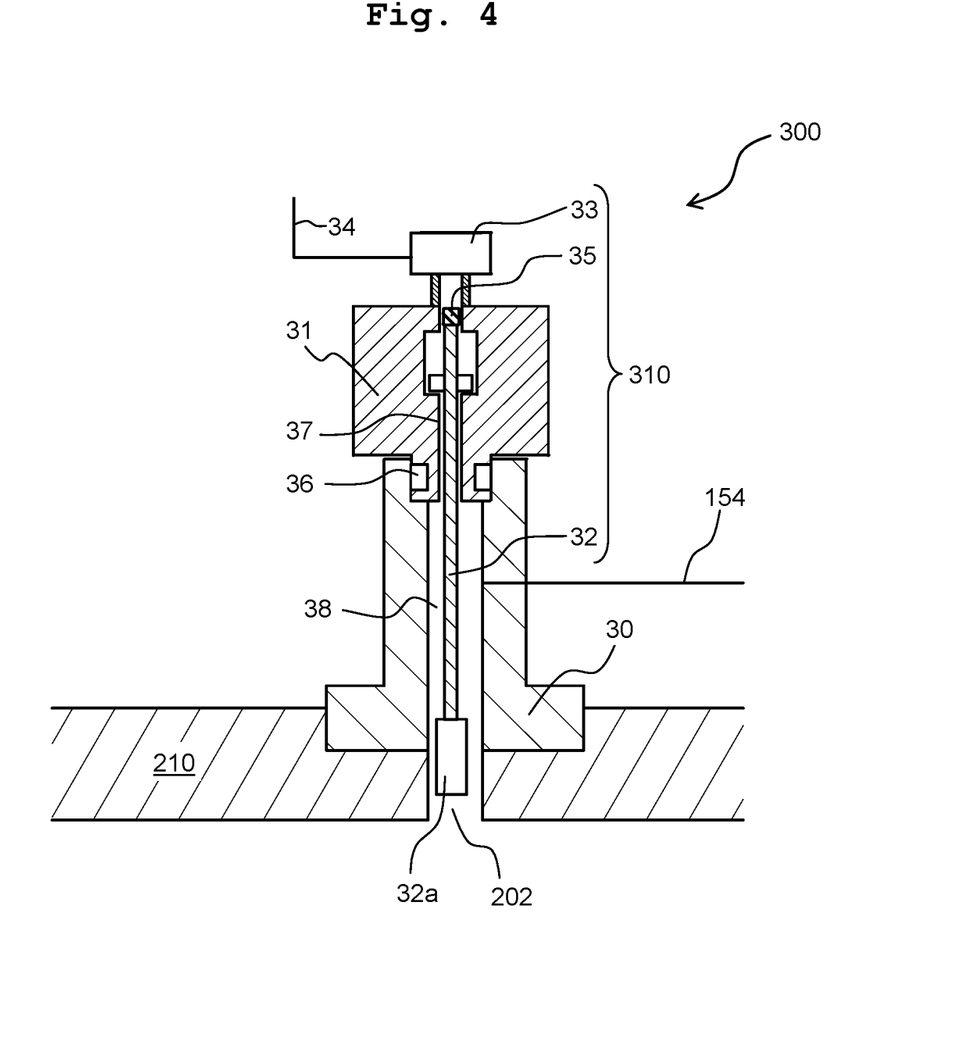
FIG. 4 schematically shows an introducing speed adjusting container used in the embodiment.

In the embodiment of the present teaching, the introducing speed adjusting container 300 is provided with an expansion detecting mechanism 310 which can stably and mechanically detect the expansion of the resin even in the case of the pressurized atmosphere. As shown in FIG. 4, the introducing speed adjusting container 300 has a cylindrical main body 30 which has a lower portion connected to the introducing port 202 and which has a space 38 therein for allowing the physical foaming agent to stay, and a lid 31 which is connected to the main body 30 to hermetically close the space 38 and which is formed with a through-hole 37 communicated with the space 38. The bomb 100 is connected to the space 38 by the aid of a piping 154, and the physical foaming agent is supplied via the piping 154. The space 38 is constantly in the pressurized state, because the physical foaming agent stays. In order to hermetically close the space 38 in the pressurized state reliably, the lid 31 has a seal 36. The expansion detecting mechanism 310, which is provided for the introducing speed adjusting container 300, has a detection rod 32 (movable member) which is arranged in the space 38 and the through-hole 37 and which has its position that is displaceable in the upward direction by being brought in contact with the molten resin expanded from the vent, and a magnetic sensor 33 (detecting unit) which is arranged on the lid 31 so that the through-hole 37 is closed and which highly accurately detects the positional displacement of the detection rod 32 in a non-contact manner. The magnetic sensor 33 is connected to the control device (not shown) of the molding apparatus 1000 by a signal line 34.

As for the detection rod 32, the upper portion is retained in the through-hole 37, the lower portion extends from the through-hole 37 into the space 38, and the lower end portion 32a is inserted into the introducing port 202. Further, the detection rod 32 has a permanent magnet 35 which is disposed at the upper end portion. The detection rod 32 is retained in the through-hole 37 with no load without any interference exerted by surrounding parts. Therefore, the detection rod 32 can easily move in the upward direction (direction directed to the magnetic sensor 33) even under the pressurized atmosphere.

When the molten resin intends to expand from the introducing port 202, then the molten resin is brought in contact with the lower end portion 32a of the rod 32, and the molten resin pushes and lifts the detection rod 32 in the upward direction. In accordance therewith, the position of the permanent magnet 35 is also displaced in the upward direction. The magnetic sensor 33 highly accurately detects the slight positional displacement of the permanent magnet 35 in the non-contact manner. The signal is fed to the control device (not shown) of the production apparatus 1000 via the signal line 34. Accordingly, the control device detects the expansion of the resin. Then, the control device sends the error signal to stop the driving of the production apparatus 1000 including the plasticizing cylinder 210. Accordingly, it is possible to avoid, for example, such a trouble that the space 38 of the introducing speed adjusting container 300 is fulfilled with the molten resin and the lid 31 cannot be removed from the main body 30.

In the embodiment of the present teaching, it is preferable that the length of the starvation zone 23 in the flow direction of the molten resin is long in order to secure the contact area and the contact time between the molten resin and the physical foaming agent. However, if the length of the starvation zone 23 is excessively long, a harmful influence arises such that the molding cycle and the screw length are prolonged or lengthened. On this account, the length of the starvation zone is preferably twice to twelve times the inner diameter of the plasticizing cylinder 210 and more preferably four times to ten times the inner diameter of the plasticizing cylinder 210. Further, it is preferable that the length of the starvation zone 23 covers the entire range of the weighing stroke in the injection molding. That is, it is preferable that the length of the starvation zone 23 in the flow direction of the molten resin is not less than the length of the weighing stroke in the injection molding. The screw 20 is moved frontwardly and backwardly in accordance with the plasticization, the weighing, and the injection of the molten resin. However, when the length of the starvation zone 23 is not less than the length of the weighing stroke, the introducing port 202 can be thereby arranged (formed) in the starvation zone 23 at all times during the production of the foamed molded product. In other words, even when the screw 20 is moved frontwardly and backwardly during the production of the foamed molded product, any zone other than the starvation zone 23 is not located at the position of the introducing port 202. Accordingly, the physical foaming agent, which is introduced from the introducing port 202, is constantly introduced into the starvation zone 23 during the production of the foamed molded product. As described above, when the starvation zone, which has the sufficient and appropriate size (length), is provided, and the physical foaming agent having the fixed pressure is introduced thereinto, then the starvation zone 23 can be thereby retained at the fixed pressure more easily. In the embodiment of the present teaching, as shown in FIG. 2, the length of the starvation zone 23 is substantially the same as the length of the portion of the screw 20 which is disposed downstream from the ring 26 wherein the diameter of the shaft of the screw 20 and the depth of the screw flight are constant.

In the next place, the molten resin in the starved state and the physical foaming agent having the fixed pressure are brought in contact with each other in the starvation zone 23 in the state in which the starvation zone 23 is retained at the fixed pressure (Step S4 shown in FIG. 1). That is, the molten resin is pressurized at the fixed pressure by the physical foaming agent in the starvation zone 23. The starvation zone 23 is unfulfilled with the molten resin (starved state), and there is the space in which the physical foaming agent can exist. Therefore, the physical foaming agent and the molten resin can be efficiently brought in contact with each other. The physical foaming agent, which is brought in contact with the molten resin, permeates into the molten resin, and the physical foaming agent is consumed. When the physical foaming agent is consumed, the physical foaming agent, which stays in the introducing speed adjusting container 300, is supplied to the starvation zone 23. Accordingly, the pressure of the starvation zone 23 is retained at the fixed pressure, and the molten resin is continuously brought in contact with the physical foaming agent having the fixed pressure.

In the case of the conventional foam molding based on the use of the physical foaming agent, the physical foaming agent at a high pressure, which is in a predetermined amount, has been forcibly introduced into the plasticizing cylinder within a predetermined time. Therefore, it has been necessary that the pressure of the physical foaming agent should be raised to the high pressure, and the amount of introduction, the time of introduction into the molten resin and the like should be correctly controlled. The physical foaming agent is brought in contact with the molten resin for only the short time of introduction. On the contrary, in the embodiment of the present teaching, the physical foaming agent is not forcibly introduced into the plasticizing cylinder 210. The physical foaming agent having the fixed pressure is continuously supplied into the plasticizing cylinder so that the pressure of the starvation zone 23 is fixed or constant, and the physical foaming agent is continuously brought in contact with the molten resin. Accordingly, the amount of dissolution (amount of permeation) of the physical foaming agent into the molten resin, which is determined by the temperature and the pressure, is stabilized. Further, the physical foaming agent of the embodiment of the present teaching is constantly brought in contact with the molten resin. Therefore, the physical foaming agent, which is in the necessary and sufficient amount, can permeate into the molten resin. Accordingly, in the case of the foamed molded product produced in the embodiment of the present teaching, the foam cells are fine, in spite of the use of the physical foaming agent having the low pressure as compared with any conventional molding method based on the use of the physical foaming agent.

Further, in the case of the production method of the embodiment of the present teaching, it is unnecessary to control, for example, the amount of introduction and the time of introduction of the physical foaming agent. Therefore, it is unnecessary to provide any driving valve including, for example a check valve and a solenoid-operated valve as well as any control mechanism for controlling the same. It is possible to suppress the apparatus cost. Further, the physical foaming agent, which is used in the embodiment of the present teaching, has the pressure lower than that of any conventional physical foaming agent. Therefore, the load on the apparatus is small as well.

In the embodiment of the present teaching, the starvation zone 23 is constantly retained at the fixed pressure during the production of the foamed molded product. In other words, in order to supplement the physical foaming agent consumed in the plasticizing cylinder, all of the steps of the method for producing the foamed molded product are carried out, while continuously supplying the physical foaming agent having the fixed pressure. Further, in the embodiment of the present teaching, for example, when the injection molding is continuously performed for a plurality of shots, the molten resin, which corresponds to the next shot, is also prepared in the plasticizing cylinder during the period in which the injection step, the cooling step for the molded product, and the taking out step for the molded product are performed. The molten resin, which corresponds to the next shot, is pressurized at the fixed pressure by the physical foaming agent. In other words, in the case of the injection molding for the plurality of shots performed continuously, 1 cycle of the injection molding, which includes, for example, the plasticization and weighing step, the injection step, the cooling step for the molded product, and the taking out step, is performed in the state in which the molten resin and the physical foaming agent having the fixed pressure are constantly present and brought in contact with each other in the plasticizing cylinder, i.e., in the state in which the molten resin is constantly pressurized at the fixed pressure by the physical foaming agent in the plasticizing cylinder. Similarly, when the continuous molding such as the extrusion molding or the like is performed, the molding is also performed in the state in which the molten resin and the physical foaming agent having the fixed pressure are constantly present and brought in contact with each other in the plasticizing cylinder, i.e., in the state in which the molten resin is constantly pressurized at the fixed pressure by the physical foaming agent in the plasticizing cylinder.

In the next place, the molten resin, which has been brought in contact with the physical foaming agent, is molded into the foamed molded product (Step S5 shown in FIG. 1). The plasticizing cylinder 210 used in the embodiment of the present teaching has a recompression zone 24 which is arranged adjacently to the starvation zone 23 downstream from the starvation zone 23 wherein the molten resin is compressed and the pressure is raised. At first, the molten resin in the starvation zone 23 is allowed to flow to the recompression zone 24 in accordance with the rotation of the plasticizing screw 20. The molten resin, which contains the physical foaming agent, is subjected to the pressure adjustment in the recompression zone 24, the molten resin is fed to the front of the plasticizing screw 20, and the molten resin is weighed. In this procedure, the molten resin, which is fed to the front of the plasticizing screw 20, has the internal pressure which is controlled as the screw back pressure by a hydraulic motor or an electric motor (not shown) connected to the back of the plasticizing screw 20. In the embodiment of the present teaching, in order that the molten resin and the physical foaming agent are compatibly dissolved uniformly or homogeneously without separating the physical foaming agent from the molten resin and the resin density is stabilized, it is preferable that the internal pressure of the molten resin fed to the front of the plasticizing screw 20, i.e., the screw back pressure is controlled to be higher than the pressure of the starvation zone 23 retained to be fixed or constant, by about 1 to 4 MPa. Note that in the embodiment of the present teaching, a check ring 50 is provided at the forward end of the screw 20 so that the compressed resin, which is disposed at the front of the screw 20, does not flow backward to the upstream side. Accordingly, the pressure of the starvation zone 23 is not affected by the resin pressure at the front of the screw 20 during the weighing.

The method for molding the foamed molded product is not specifically limited. For example, the molded product can be molded, for example, by the injection foam molding, the extrusion foam molding, or the foam blow molding. In the embodiment of the present teaching, the injection foam molding is performed such that the weighed molten resin is injected and charged into a cavity 253 in the mold 251 from the plasticizing cylinder 210 shown in FIG. 2. As for the injection foam molding, the short shot method may be used such that the molten resin, which is in a charge volume of 75% to 95% of the mold cavity volume, is charged into the mold cavity 253, and the mold cavity is subjected to the charging while expanding foams. Alternatively, the core back method may be used such that the molten resin, which is in a charge amount of 100% of the mold cavity volume, is charged, and then the cavity volume is expanded to cause the foaming. The obtained foamed molded product has foam cells at the inside. Therefore, the contraction or shrinking of the thermoplastic resin, which is caused during the cooling, is suppressed to mitigate the sink mark and the warpage. It is possible to obtain the molded product having a low specific gravity.

In the production method of the embodiment of the present teaching explained above, it is unnecessary to control, for example, the amount of introduction and the time of introduction of the physical foaming agent into the molten resin. Therefore, it is possible to omit or simplify the complicated control device, and it is possible to reduce the apparatus cost. Further, in the method for producing the foamed molded product of the embodiment of the present teaching, the molten resin in the starved state and the physical foaming agent having the fixed pressure are brought in contact with each other in the starvation zone 23 in the state in which the starvation zone 23 is retained at the fixed pressure. Accordingly, the amount of dissolution (amount of permeation) of the physical foaming agent with respect to the molten resin can be stabilized by the simple mechanism.

EXAMPLES

The present teaching will be further explained below by using Examples and Comparative Example. However, the present teaching is not limited to Examples and Comparative Example explained below.

Example 1

In Example 1, a foamed molded product was produced by using mineral-reinforced polyamide 6 (PA6) as the thermoplastic resin and utilizing nitrogen as the physical foaming agent.

(1) Production Apparatus

In Example 1, the production apparatus 1000 shown in FIG. 2 used in the embodiment described above was used. Details of the production apparatus 1000 will be explained. As described above, the production apparatus 1000 is the injection molding apparatus including the plasticizing cylinder 210, the bomb 100 which serves as the physical foaming agent supply mechanism for supplying the physical foaming agent to the plasticizing cylinder 210, the clamping unit 250 which is provided with the mold 251, and the control device (not shown) which is provided to control the operations of the plasticizing cylinder 210 and the clamping unit 250.

A shutoff valve 28, which is opened/closed in accordance with the driving of an air cylinder, is provided at a nozzle forward end 29 of the plasticizing cylinder 210. The interior of the plasticizing cylinder 210 can be retained at a high pressure. The mold 251 is brought in tight contact with the nozzle forward end 29. The molten resin is injected and charged from the nozzle forward end 29 into the cavity 253 formed by the mold 251. A resin supply port 201 for supplying the thermoplastic resin to the plasticizing cylinder 210 and the introducing port 202 for introducing the physical foaming agent into the plasticizing cylinder 210 are formed in this order as referred to from the upstream side on the upper side surface of the plasticizing cylinder 210. A resin supplying hopper 211 and the introducing speed adjusting container 300 are arranged for the resin supply port 201 and the introducing port 202 respectively. The bomb 100 is connected to the introducing speed adjusting container 300 by the piping 154 via a buffer tank 153, a pressure reducing valve 151, and a pressure gauge 152. Further, a sensor (not shown) for monitoring the pressure is provided at the position opposed to the introducing port 202 of the plasticizing cylinder 210.

The screw 20 is arranged rotatably and movably back and forth in the plasticizing cylinder 210 in order to facilitate the plasticization and the melting of the thermoplastic resin and perform the weighing and the injection of the molten resin. As described above, the screw 20 is provided with the ring 26 having the half-divided shape and the large diameter portion 20A of the screw 20 as the mechanisms for raising the flow resistance of the molten resin.

As for the plasticizing cylinder 210, the thermoplastic resin is supplied from the resin supply port 201 into the plasticizing cylinder 210. The thermoplastic resin is plasticized by the band heater (not shown) to provide the molten resin which is fed to the downstream in accordance with the forward rotation of the screw 20. Owing to the presence of the ring 26 and the large diameter portion 20A provided for the screw 20, the molten resin is compressed to raise the pressure on the upstream side of the ring 26, and the downstream side of the ring 26 is unfulfilled with the molten resin (starved state). The molten resin, which is further fed to the downstream, is recompressed and weighed in the vicinity of the forward end of the plasticizing cylinder 210 before the injection.

Accordingly, the plasticization zone 21 in which the thermoplastic resin is plasticized and melted, the compression zone 22 in which the molten resin is compressed to raise the pressure, the starvation zone 23 which is unfulfilled with the molten resin, and the recompression zone 24 in which the molten resin subjected to the pressure reduction in the starvation zone is compressed again are formed in this order as referred to from the upstream side in the plasticizing cylinder 210. The ring 26, which is provided for the screw 20, is positioned at the boundary of the compression zone 22 with respect to the starvation zone 23. Further, the introducing port 202, from which the physical foaming agent is introduced, is provided in the starvation zone 23.

In the production apparatus 1000, the inner diameter of the plasticizing cylinder 210 was 35 mm, and the inner diameter of the introducing port 202 was 8 mm. Therefore, the inner diameter of the introducing port 202 was about 23% of the inner diameter of the plasticizing cylinder 210. The volume of the introducing speed adjusting container 300 was about 80 mL. Further, in Example 1, the mold, in which the size of the cavity 253 was 100 mm×200 mm×3 mm, was used.

(2) Production of Foamed Molded Product

In Example 1, a nitrogen bomb having a volume of 47 L, which was charged with nitrogen at 14.5 MPa, was used as the bomb 100. At first, the value of the pressure reducing valve 151 was set to 4 MPa. The bomb 100 was opened to supply nitrogen at 4 MPa from the introducing port 202 of the plasticizing cylinder 210 into the starvation zone 23 via the buffer container 153 having a volume of 0.99 L, the pressure reducing valve 151, the pressure gauge 152, and the introducing speed adjusting container 300. During the production of the molded product, the bomb 100 was open at all times.

In the plasticizing cylinder 210, the band heater (not shown) was used to adjust the plasticization zone 21 at 220° C., the compression zone 22 at 240° C., the starvation zone 23 at 220° C., and the recompression zone 24 at 240° C. Then, resin pellets of the thermoplastic resin (Gramide T777-02 produced by Toyobo) were supplied from the resin supplying hopper 211, and the screw 20 was forwardly rotated. Accordingly, the thermoplastic resin was heated and kneaded to provide the molten resin in the plasticization zone 21. The screw 20 was forwardly rotated at a back pressure of 6 MPa and a number of revolutions of 100 rpm, and the molten resin was thereby allowed to flow from the plasticization zone 21 to the compression zone 22. Further, the molten resin was allowed to flow to the starvation zone 23.

The molten resin flowed to the starvation zone 23 through the gap between the inner wall of the plasticizing cylinder 210 and the large diameter portion 20A of the screw and the ring 26. Therefore, the supply amount of the molten resin supplied to the starvation zone 23 was restricted. Accordingly, the molten resin was compressed to raise the pressure in the compression zone 22 disposed on the upstream side of the ring 26, and the starvation zone 23 disposed on the downstream side was unfulfilled with the molten resin (starved state). The starvation zone 23 was unfulfilled with the molten resin (starved state), and hence the physical foaming agent (nitrogen) introduced from the introducing port 202 was present in the space in which the molten resin was absent. The molten resin was pressurized by the physical foaming agent.

Further, the molten resin was fed to the recompression zone 24, and the molten resin was recompressed. The molten resin in an amount of one shot was weighed at the forward end portion of the plasticizing cylinder 210. After that, the shutoff valve 28 was opened to inject and charge the molten resin so that the charge ratio was 90% of the volume of the cavity 253, and thus the foamed molded product having a flat plate shape was molded (short shot method). After the molding, the foamed molded product was taken out from the interior of the mold after waiting for the cooling of the foamed molded product. The cooling time was 10 seconds. The molding cycle was 18 seconds as the value equivalent to that of the molding cycle of a solid molded product (unfoamed molded product).

The injection molding for the molded product explained above was continuously performed for 100 shots to obtain 100 individuals of foamed molded products. During the production of 100 individuals of foamed molded products, the pressure of the starvation zone 23 in the plasticizing cylinder 210 was constantly measured by the pressure sensor (not shown). As a result, the pressure of the starvation zone 23 was constantly at 4 MPa. Further, the pressure gauge 152, which indicated the pressure of nitrogen supplied to the starvation zone 23, had the value which was constantly 4 MPa during the production of the foamed molded product as well. According to the above, it was successfully confirmed that the molten resin was constantly pressurized by nitrogen at 4 MPa in the starvation zone 23 throughout 1 cycle of the injection molding including, for example, the plasticizing and weighing step, the injection step, the cooling step for the molded product, and the taking out step and that the molten resin was constantly pressurized by nitrogen in the starvation zone 23 during the continuous molding for 100 individuals of molded products. Further, it was confirmed that the expansion detecting mechanism 310 did not detect the expansion of the molten resin and the state of the starvation zone 23 was stable during the production of 100 individuals of foamed molded products.

The weight dispersion of the obtained 100 individuals of foamed molded products was evaluated by using the value ($\sigma$/ave. (%)) obtained by dividing the standard deviation ($\sigma$) by the weight average value (ave.). As a result, ($\sigma$/ave. (%))=0.21% was obtained. The same evaluation was performed for solid molded products (unfoamed molded products). As a result, ($\sigma$/ave. (%))=0.22% was obtained, which was the value equivalent to that of Example 1. According to this result, it has been revealed that the weight stability of the foamed molded product of Example 1 is equivalent to that of the solid molded product.

In Example 1, the foamed molded product, which had a specific gravity lighter than that of the solid molded product by about 10% and which had its corrected warpage, was successfully produced continuously and stably. It is considered that the ratio of reduction of the specific gravity is affected by the amount of dissolution (amount of permeation) of the physical foaming agent. According to this result, it was revealed that the amount of dissolution (amount of permeation) of the physical foaming agent with respect to the molten resin was stabilized. Further, the swirl mark, in which the separated gas was transferred to the molded product surface to deteriorate the surface property, was formed merely slightly. Further, the state of foam cells was observed for the cross section of the obtained foamed molded product. As a result, it was revealed that the average cell diameter of foam cells was 20 µm which was fine.

Example 2

In Example 2, carbon dioxide was used as the physical foaming agent. Therefore, a liquid carbon dioxide bomb having a pressure of 6 MPa was used as the bomb 100 as the apparatus for supplying the physical foaming agent. Then, the value of the pressure reducing valve 151 was set to 4.5 MPa. 100 individuals of foamed molded products were continuously produced by the same method as that used in Example 1 except for the above.

During the production of the foamed molded product, the pressure of the starvation zone 23 in the plasticizing cylinder 210 was constantly measured by the pressure sensor (not shown). As a result, the pressure of the starvation zone 23 was constantly at 4.5 MPa. Further, the pressure gauge 152, which indicated the pressure of carbon dioxide supplied to the starvation zone 23, had the value which was constantly 4.5 MPa during the production of the foamed molded product as well. According to the above, it was successfully confirmed that the molten resin was constantly pressurized by carbon dioxide at 4.5 MPa in the starvation zone 23 throughout 1 cycle of the injection molding including, for example, the plasticizing and weighing step, the injection step, the cooling step for the molded product, and the taking out step and that the molten resin was constantly pressurized by carbon dioxide in the starvation zone 23 during the continuous molding for 100 individuals of molded products. Further, it was confirmed that the expansion detecting mechanism 310 did not detect the expansion of the molten resin and the state of the starvation zone 23 was stable during the production of 100 individuals of foamed molded products.

The weight dispersion of the obtained 100 individuals of foamed molded products was evaluated by using the value ($\sigma$/ave. (%)) obtained by dividing the standard deviation ($\sigma$) by the weight average value (ave.). As a result, ($\sigma$/ave.

(%))=0.24% was obtained. The same evaluation was performed for solid molded products (unfoamed molded products). As a result, (σ/ave. (%))=0.22% was obtained, which was the value equivalent to that of Example 2, in the same manner as in Example 1. According to this result, it has been revealed that the weight stability of the foamed molded product of Example 2 is equivalent to that of the solid molded product.

In Example 2, the foamed molded product, which had a specific gravity lighter than that of the solid molded product by about 10% and which had its corrected warpage, was successfully produced continuously and stably. According to this result, it was revealed that the amount of dissolution (amount of permeation) of the physical foaming agent with respect to the molten resin was stabilized. Further, the state of foam cells was observed for the cross section of the obtained foamed molded product. As a result, the average cell diameter of foam cells was 80 μm which was larger than that of Example 1. It is speculated that the difference in the size of the foam cell between Example 2 and Example 1 results from the difference in the type of the physical foaming agent.

According to the result of Example 2, it has been revealed that the pressure of the starvation zone 23 can be retained by the simple and convenient method, and the effect, which is the same as or equivalent to that of Example 1 based on the use of nitrogen as the physical foaming agent, is obtained, even when carbon dioxide is used as the physical foaming agent.

Example 3

In Example 3, a polypropylene (PP) resin containing inorganic filler was used as the thermoplastic resin. Further, the value of the pressure reducing valve 151 was set to 8 MPa, and the core back method was used as the foam molding method. A foamed molded product was produced by the same method as that of Example 1 except for the above.

PP resin pellets containing no reinforcing material such as an inorganic filler or the like (Prime Polypro J105G produced by Prime Polymer) and master batch pellets containing 80% by weight of talc as an inorganic filler (MP480 produced by Lion Idemitsu Composites) were mixed with each other so that the weight ratio was 80:20. In the same manner as Example 1, the mixed resin material was supplied from the resin supplying hopper 211 into the plasticizing cylinder 210 to plasticize and weigh the resin material in the plasticizing cylinder 210. The shutoff valve 28 was opened, and the molten resin was injected and charged into the cavity 253 so that the charge ratio was 100% of the volume of the cavity 253. Three seconds thereafter, the clamping unit 250 was driven to move backwardly, and the mold was opened so that the cavity volume was expanded from 100% to 200%. Thus, the foamed molded product was molded (core back method). After the molding, the foamed molded product was taken out from the inside of the mold after waiting for the cooling of the foamed molded product. The cooling time was 30 seconds. Note that the core back method was used in Example 3. Therefore, the wall thickness of the molded product was increased, and the thermal insulation effect was enhanced as compared with Example 1 in which the short shot method was used. For this reason, the cooling time was longer than that of Example 1.

The injection molding for molding the molded product explained above was continuously performed for 30 shots to obtain 30 individuals of foamed molded products. During the production of the foamed molded product, the pressure of the starvation zone 23 in the plasticizing cylinder 210 was constantly measured by the pressure sensor (not shown). As a result, the pressure of the starvation zone 23 was constantly at 8 MPa. Further, the pressure gauge 152, which indicated the pressure of nitrogen supplied to the starvation zone 23, had the value which was constantly 8 MPa during the production of the foamed molded product as well. According to the above, it was successfully confirmed that the molten resin was constantly pressurized by nitrogen at 8 MPa in the starvation zone 23 throughout 1 cycle of the injection molding including, for example, the plasticizing and weighing step, the injection step, the cooling step for the molded product, and the taking out step and that the molten resin was constantly pressurized by nitrogen in the starvation zone 23 during the continuous molding for 30 individuals of molded products.

In Example 3, the foamed molded product, which had a specific gravity lighter than that of the solid molded product by about 48% and which had its corrected warpage, was successfully produced continuously and stably. According to this result, it was revealed that the amount of dissolution (amount of permeation) of the physical foaming agent with respect to the molten resin was stabilized. Further, the surface state of the obtained foamed molded product was observed. The swirl mark, in which the separated gas was transferred to the molded product surface to deteriorate the surface property, was formed merely slightly. Further, the state of foam cells was observed for the cross section of the obtained foamed molded product. The average cell diameter of foam cells was 35 μm which was fine.

Example 4

In Example 4, a sheet-shaped foamed molded product was continuously produced by the extrusion molding by using the production apparatus 2000 shown in FIG. 3. In Example 4, non-reinforced polyamide 6 (PA6) (Amilan CM1021FS produced by Toray) was used as the thermoplastic resin. Further, nitrogen in the air was purified, compressed, and used as the physical foaming agent.

(1) Production Apparatus

The production apparatus 2000 is an extrusion molding apparatus including a plasticizing cylinder 410 which is internally provided with a screw 40, a physical foaming agent supply mechanism 500 which supplies the physical foaming agent to the plasticizing cylinder 410, and a control device (controller) (not shown) which is provided to control the operation of the plasticizing cylinder 410. A molten resin, which is plasticized and melted in the plasticizing cylinder 410, flows from the right to the left as viewed in FIG. 3, in the same manner as the plasticizing cylinder 210 shown in FIG. 2 used in Example 1. Therefore, at the inside of the plasticizing cylinder 410 of Example 4, the right as viewed in FIG. 3 is defined as "upstream" or "backward", and the left is defined as "downstream" or "frontward".

A die 420 is provided at the forward end of the plasticizing cylinder 410. The molten resin is extruded from the die 420 into the atmospheric air, and thus the molten resin is subjected to the extrusion molding. A resin supply port 401 for supplying the thermoplastic resin to the plasticizing cylinder 410 and two introducing ports 402A, 402B for introducing the physical foaming agent into the plasticizing cylinder 410 are formed in this order as referred to from the upstream side on the upper side surface of the plasticizing cylinder 410. A resin supplying hopper 411 and a feed screw 412 are arranged at the resin supply port 401. Introducing speed adjusting containers 300A, 300B are arranged at the introducing ports 402A, 402B respectively. Each of the introducing speed adjusting containers 300A, 300B has the structure which is the same as or equivalent to that of the introducing speed adjusting container 300 shown in FIG. 4 used in Example 1. The physical foaming agent supply mechanism 500 is connected to the introducing speed adjusting containers 300A, 300B via a buffer tank 153, a pressure reducing valve 151, and a pressure gauge 152. Further, sensors for monitoring the pressures (not shown) are provided respectively at positions of the plasticizing cylinder 410 opposed to the introducing ports 402A, 402B.

In order to facilitate the plasticization and melting of the thermoplastic resin, the screw 40 is arranged rotatably in the plasticizing cylinder 410. The screw 40 is provided with a ring 46 having a half-divided shape and large diameter portions 40A, 40B of the screw 40 as mechanisms for raising the flow resistance of the molten resin.

As for the plasticizing cylinder 410, the thermoplastic resin is supplied from the resin supply port 401 into the plasticizing cylinder 410. The thermoplastic resin is plasticized by the band heater (not shown) to provide the molten resin which is fed to the downstream in accordance with the forward rotation of the screw 40. As for the molten resin, owing to the presence of the ring 46 and the large diameter portion 40A of the screw 40, the molten resin is compressed to raise the pressure on the upstream side of the ring 46, and the downstream side of the ring 46 is unfulfilled with the molten resin (starved state). The molten resin, which is further fed to the downstream, is compressed to raise the pressure owing to the presence of the large diameter portion 40B of the screw 40. The downstream side of the large diameter portion 40B is unfulfilled with the molten resin again (starved state). The molten resin, which is further fed to the downstream, is recompressed in the vicinity of the forward end of the plasticizing cylinder 210 before the extrusion, and then the molten resin is extruded from the die 420.

Accordingly, the plasticization zone 41 in which the thermoplastic resin is plasticized and melted, the first compression zone 42A in which the molten resin is compressed to raise the pressure, the first starvation zone 43A which is unfulfilled with the molten resin, the second compression zone 42B in which the molten resin is compressed again, the second starvation zone 43B which is unfulfilled with the molten resin again, and the recompression zone 44 in which the molten resin subjected to the pressure reduction in the starvation zone is compressed again are formed in this order as referred to from the upstream side in the plasticizing cylinder 410. The ring 46, which is provided for the screw 40, is positioned at the boundary of the first compression zone 42A with respect to the first starvation zone 43A. The large diameter portions 40A, 40B of the screw 40 are arranged in the first compression zone 42A and the second compression zone 42B respectively. Further, the introducing ports 402A, 402B, from which the physical foaming agent is introduced, are provided in the first starvation zone 43A and the second starvation zone 43B respectively. As described above, the plasticizing cylinder 410 has the two starvation zones and the two introducing ports, and the physical foaming agent is introduced from the two introducing ports into the plasticizing cylinder.

The physical foaming agent supply mechanism 500 has a nitrogen generating apparatus 51 which purifies or refines nitrogen by allowing the air in the atmospheric air to pass through a nitrogen separation membrane while compressing the air by a compressor, and an air-driven booster pump 52 which raises the pressure of purified nitrogen to a predetermined pressure.

In the production apparatus 2000, the inner diameter of the plasticizing cylinder 410 was 35 mm, and both of the inner diameters of the first and second introducing ports 402A, 402B were 8 mm. Therefore, both of the inner diameters of the first and second introducing ports 402A, 402B were 23% of the inner diameter of the plasticizing cylinder 410. The volumes of both of the introducing speed adjusting containers 300A, 300B were about 80 mL. Further, in Example 4, the die 420, in which the extrusion port was linear (flat), was used so that the sheet-shaped molded product was obtained. The size of the gap of the extrusion port, which corresponded to the thickness of the sheet, was 0.2 mm.

(2) Production of Foamed Molded Product

At first, nitrogen having a pressure of 0.8 MPa was purified or refined by allowing the air in the atmospheric air to pass through the nitrogen separation membrane while compressing the air by the compressor by using the nitrogen generating apparatus 51 of the physical foaming agent supply mechanism 500. Subsequently, the pressure of purified nitrogen was raised to 10 MPa by the booster pump 52, followed by being accumulated in the buffer tank 153 under pressure. The value of the pressure reducing valve 151 was set to 6 MPa. Nitrogen was distributed from the buffer tank 153 to the two introducing speed adjusting containers 300A, 300B via the pressure reducing valve 151 and the pressure gauge 152. Further, nitrogen at 6 MPa was supplied from the introducing speed adjusting containers 300A, 300B to the first and second starvation zones 43A, 43B of the plasticizing cylinder 410 respectively.

In the plasticizing cylinder 410, the band heater (not shown) was used to adjust the plasticization zone 41 at 240° C., the first and second compression zones 42A, 42B at 250° C., the first and second starvation zones 43A, 43B at 220° C., and the recompression zone 44 at 240° C. Then, the resin pellets of the thermoplastic resin were supplied from the resin supplying hopper 411, and the screw 40 was forwardly rotated. Accordingly, the thermoplastic resin was heated and kneaded to provide the molten resin in the plasticization zone 41. In Example 4, in order to stably maintain the starved states of the first and second starvation zones 43A, 43B, the supply amount of the resin pellets from the hopper 411 to the plasticizing cylinder 410 was restricted by using the feed screw 412. The molten resin in the plasticization and melting zone 41 can be decreased by decreasing the feed amount of the resin pellets. Accordingly, the starved state was stabilized in the first and second starvation zones 43A, 43B disposed downstream. The molten resin was allowed to flow from the plasticization zone 41 to the first compression zone 42A, and the molten resin was further allowed to flow to the first starvation zone 43A by continuously rotating the screw 40 forwardly at a number of revolutions of 150 rpm.

The molten resin flows to the first starvation zone 43A through the gap between the inner wall of the plasticizing cylinder 410 and the large diameter portion 40A of the screw and the ring 46. Therefore, the supply amount of the molten resin supplied to the first starvation zone 43A was restricted. Accordingly, the molten resin was compressed to raise the pressure in the first compression zone 42A disposed on the upstream side of the ring 46, and the first starvation zone 43A disposed on the downstream side was unfulfilled with the molten resin (starved state). The first starvation zone 43A was unfulfilled with the molten resin (starved state), and hence nitrogen introduced from the introducing port 402A was present in the space in which the molten resin was absent. The molten resin was pressurized by nitrogen. Further, the molten resin was fed to the downstream. The molten resin was compressed in the second compression zone 42B in the same manner as described above. The starved state was provided again in the second starvation zone 43B. The molten resin was pressurized by nitrogen. As described above, in Example 4, the molten resin is pressurized twice by nitrogen as the physical foaming agent in the first and second starvation zones 43A, 43B. Accordingly, the amount of the physical foaming agent permeated into the molten resin was increased.

Further, the molten resin was fed to the recompression zone 44, and the molten resin was recompressed. After that, the molten resin was continuously extruded from the die 420 into the atmospheric air to obtain the sheet-shaped foamed molded product having a length of 10 m. In Example 4, the molten resin was foamed five times the size of the gap of the extrusion port of the die 420 to obtain the sheet having a thickness of 1.0 mm.

During the production of the foamed molded product, the pressures of the first and second starvation zones 43A, 43B in the plasticizing cylinder 41 were constantly measured by the pressure sensors (not shown). As a result, the pressures of the first and second starvation zones 43A, 43B were constantly at 6 MPa. Further, the value of the pressure gauge 152, which indicated the pressure of nitrogen supplied to the first and second starvation zones 43A, 43B, was also constantly 6 MPa during the production of the foamed molded product. According to the above, it was successfully confirmed that the molten resin was constantly pressurized by nitrogen at 6 MPa during the extrusion molding in the first and second starvation zones 43A, 43B. Further, it was confirmed that the expansion detecting mechanism 310 did not detect the expansion of the molten resin during the production of the foamed molded product, and the states of the first and second starvation zones 43A, 43B were stable.

In Example 4, the foamed molded product was successfully produced continuously and stably. According to this result, it was revealed that the amount of dissolution (amount of permeation) of the physical foaming agent with respect to the molten resin was stabilized. Further, the state of foam cells was observed for the cross section of the obtained foamed molded product. The average cell diameter of foam cells was 20 μm which was fine.

Example 5

In Example 5, the injection molding was continuously performed for 100 shots in the same manner as Example 1 except that the inner diameter of the introducing port 202 for introducing the physical foaming agent was 1 mm in the production apparatus 1000 used in Example 1. Therefore, the inner diameter of the introducing port 202 in Example 5 was about 2.9% of the inner diameter (35 mm) of the plasticizing cylinder 210.

In Example 5, the foamed molded products having the same or equivalent characteristics as those of Example 1 were successfully produced until 50 shots. It was successfully confirmed that the molten resin was constantly pressurized by nitrogen at 4 MPa in the starvation zone 23 throughout 1 cycle of the injection molding including, for example, the plasticizing and weighing step, the injection step, the cooling step for the molded product, and the taking out step during the production of 50 individuals of foamed molded products in the same manner as Example 1 and that the molten resin was constantly pressurized by nitrogen in the starvation zone 23 during the continuous molding for 50 individuals of molded products.

However, the foaming performance of the molded product was gradually lowered after exceeding 50 shots. Any molded product having foam cells was unable to be produced after exceeding 80 shots. The introducing speed adjusting container 300 was removed to confirm the introducing port 202 after the injection molding performed for 100 shots. As a result, the introducing port 202 was clogged with the resin and closed. It is speculated that the introduction of the physical foaming agent into the plasticizing cylinder was inhibited, and the foaming performance of the molded product was lowered after exceeding 50 shots, because the introducing port 202 was closed. According to the result of Example 5, it has been revealed that it is preferable that the inner diameter of the introducing port 202 is larger when the foamed molded product is continuously produced.

Comparative Example 1

In Comparative Example 1, the injection molding was continuously performed for 100 shots in the same manner as Example 1 except that a metal pad was applied to the introducing speed adjusting container 300 of the production apparatus 1000 used in Example 1 so that the volume thereof was 1 ml.

The pressure of the starvation zone 23 in the plasticizing cylinder 210 was constantly measured by the pressure sensor (not shown) during the production of 100 individuals of foamed molded products. As a result, the pressure of the starvation zone 23 fluctuated within a range of 4 MPa±1 MPa. The range of fluctuation (2 MPa) of the pressure of the starvation zone 23 was 50% with respect to the introducing pressure (4 MPa) of the physical foaming agent. In Comparative Example 1, it was impossible to retain the starvation zone 23 at the fixed pressure of the physical foaming agent. It is speculated that this was caused by the small volume of the introducing speed adjusting container 300.

The weight dispersion of the obtained 100 individuals of foamed molded products was evaluated by using the value (σ/ave. (%)) obtained by dividing the standard deviation (σ) by the weight average value (ave.). As a result, (σ/ave. (%))=0.82% was obtained. The weight dispersion was large as compared with Example 1. Further, the surface state of the obtained foamed molded product was observed. As a result, it was revealed that the foaming state of the molded product was unstable judging from the appearance of the molded product.

Example 6

In Example 6, the injection molding was continuously performed for 2100 shots in the same manner as Example 1 except that the inner diameter of the introducing port 202 for introducing the physical foaming agent was 33 mm in the production apparatus 1000 used in Example 1. Therefore, the inner diameter of the introducing port 202 of Example 6 was about 94% of the inner diameter (35 mm) of the plasticizing cylinder 210.

The pressure of the starvation zone 23 in the plasticizing cylinder 210 was constantly measured by the pressure sensor (not shown) for initial 100 shots, i.e., during the production of initial 100 individuals of foamed molded products. As a result, the pressure of the starvation zone 23 was constantly at 4 MPa. Further, the pressure gauge 152, which indicated the pressure of nitrogen supplied to the starvation zone 23, had the value which was constantly 4 MPa during the production of the foamed molded product. According to the above, it was successfully confirmed that the molten resin was constantly pressurized by nitrogen at 4 MPa in the starvation zone 23 throughout 1 cycle of the injection molding including, for example, the plasticizing and weighing step, the injection step, the cooling step for the molded product, and the taking out step and that the molten resin was constantly pressurized by nitrogen in the starvation zone 23 during the continuous molding for 100 individuals of molded products. Further, it was confirmed that the expansion detecting mechanism 310 did not detect the expansion of the molten resin and the state of the starvation zone 23 was stable during the production of 100 individuals of foamed molded products.

The weight dispersion of the obtained 100 individuals of foamed molded products was evaluated by using the value (σ/ave. (%)) obtained by dividing the standard deviation (σ) by the weight average value (ave.). As a result, (σ/ave. (%))=0.21% was obtained. The same evaluation was performed for solid molded products (unfoamed molded products). As a result, (σ/ave. (%))=0.18% was obtained, which was the value equivalent to that of Example 6. According to this result, it has been revealed that the weight stability of the foamed molded product of Example 6 is equivalent to that of the solid molded product.

In Example 6, the foamed molded product, which had a specific gravity lighter than that of the solid molded product by about 10% and which had its corrected warpage, was successfully produced continuously and stably. It is considered that the ratio of reduction of the specific gravity is affected by the amount of dissolution (amount of permeation) of the physical foaming agent. According to this result, it was revealed that the amount of dissolution (amount of permeation) of the physical foaming agent with respect to the molten resin was stabilized. Further, the swirl mark, in which the separated gas was transferred to the molded product surface to deteriorate the surface property, was formed merely slightly. Further, the state of foam cells was observed for the cross section of the obtained foamed molded product. As a result, it was revealed that the average cell diameter of foam cells was 20 μm which was fine.

Further, in Example 6, it has been successfully confirmed that the molded product, which has the characteristics that are the same as or equivalent to those of the 100 individuals of molded products evaluated previously, can be stably molded even after exceeding 2000 shots.

Example 7

In Example 7, the injection molding was continuously performed for 1100 shots in the same manner as Example 1 except that the inner diameter of the introducing port 202 for introducing the physical foaming agent was 37 mm in the production apparatus 1000 used in Example 1. Therefore, the inner diameter of the introducing port 202 of Example 7 was about 106% of the inner diameter (35 mm) of the plasticizing cylinder 210.

The pressure of the starvation zone 23 in the plasticizing cylinder 210 was constantly measured by the pressure sensor (not shown) for initial 50 shots, i.e., during the production of initial 50 individuals of foamed molded products. As a result, it was successfully confirmed that the molten resin was constantly pressurized by nitrogen at 4 MPa in the starvation zone 23 throughout 1 cycle of the injection molding including, for example, the plasticizing and weighing step, the injection step, the cooling step for the molded product, and the taking out step in the same manner as Example 1 during the production of 50 individuals of foamed molded products and that the molten resin was constantly pressurized by nitrogen in the starvation zone 23 during the continuous molding for 50 individuals of molded products.

In Example 7, the molded product was successfully molded even after exceeding 50 shots. However, the burnt deposit (burning) began to appear on the molded product after exceeding about 1000 shots. The "burnt deposit (burning)" resides in such a phenomenon that the black burnt matter appears on the surface of the molded product. After the injection molding for 1100 shots, the introducing speed adjusting container 300 was removed, and the introducing port 202 was confirmed. As a result, the discolored resin adhered to the surrounding of the introducing port 202. In Example 7, the introducing port 202 is somewhat large, which is about 106% of the inner diameter of the plasticizing cylinder 210. On this account, it is speculated that the staying of the molten resin arose in the vicinity of the introducing port, which caused the burnt deposit of the molded product.

Example 8

In Example 8, the injection molding was continuously performed for 400 shots in the same manner as Example 1 except that the inner diameter of the introducing port 202 for introducing the physical foaming agent was 5 mm in the production apparatus 1000 used in Example 1. Therefore, the inner diameter of the introducing port 202 of Example 8 was about 14% of the inner diameter (35 mm) of the plasticizing cylinder 210.

The pressure of the starvation zone 23 in the plasticizing cylinder 210 was constantly measured by the pressure sensor (not shown) for initial 50 shots, i.e., during the production of initial 50 individuals of foamed molded products. As a result, it was successfully confirmed that the molten resin was constantly pressurized by nitrogen at 4 MPa in the starvation zone 23 throughout 1 cycle of the injection molding including, for example, the plasticizing and weighing step, the injection step, the cooling step for the molded product, and the taking out step in the same manner as Example 1 during the production of 50 individuals of foamed molded products and that the molten resin was constantly pressurized by nitrogen in the starvation zone 23 during the continuous molding for 50 individuals of molded products.

In Example 8, the molded product was successfully molded stably even after exceeding 50 shots. However, the foaming performance of the molded product was gradually lowered after exceeding 200 shots. Any molded product having foam cells was unable to be produced after exceeding 300 shots. The introducing speed adjusting container 300 was removed to confirm the introducing port 202 after the injection molding for 400 shots. As a result, the introducing port 202 was clogged with the resin and closed. It is speculated that the introduction of the physical foaming agent into the plasticizing cylinder is inhibited, and the foaming performance of the molded product was lowered after exceeding 200 shots, because the introducing port 202 was closed. According to the result of Example 8, it has been revealed that it is preferable that the inner diameter of the introducing port 202 is large to some extent when the foamed molded product is continuously produced.

According to the method of the present teaching, it is possible to simplify the apparatus mechanism concerning the physical foaming agent. Further, the foamed molded product, which is excellent in the foaming performance, can be efficiently produced at the low cost.

What is claimed is:

1. An apparatus for producing a foam-molded product, comprising:
   a plasticizing cylinder which has a plasticization zone for plasticizing and melting a thermoplastic resin into a molten resin and a starvation zone for allowing the molten resin to be in a starved state, wherein the starvation zone includes therein an introducing port for introducing a physical foaming agent into the starvation zone; and
   a physical foaming agent supply mechanism which supplies the physical foaming agent to the plasticizing cylinder via the introducing port,
   wherein the introducing port contains no valve to control flow of the physical foaming agent and thus is configured to be open at all times, and the physical foaming agent having a fixed pressure is continuously introduced into the starvation zone from the physical foaming agent supply mechanism via the introducing port during the producing of the foam-molded product.

2. The apparatus according to claim 1, wherein the physical foaming agent having the fixed pressure is introduced into the starvation zone from the physical foaming agent supply mechanism via the introducing port to retain the starvation zone at the fixed pressure.

3. The apparatus according to claim 1, wherein a screw is arranged rotatably in the plasticizing cylinder, and the screw is rotated at a fixed position in the plasticizing cylinder.

4. The apparatus according to claim 1, wherein an inner diameter of the introducing port is in a range of 20% to 100% of an inner diameter of the plasticizing cylinder.

5. The apparatus according to claim 1, wherein the fixed pressure is in a range of 1 MPa to 15 MPa.

6. The apparatus according to claim 1, wherein the fixed pressure is in a range of 2 MPa to 8 MPa.

7. The apparatus according to claim 1, wherein the apparatus for producing the foam-molded product is an injection molding apparatus, and a length of the starvation zone is not less than a length of a weighing stroke in an injection molding.

8. The apparatus according to claim 1, wherein the plasticizing cylinder further comprises:
   a compression zone which is provided adjacently to the starvation zone on an upstream side of the starvation zone in a flow direction of the molten resin; and
   a mechanism which is provided in the compression zone and which raises a flow resistance of the molten resin, and
   a pressure of the molten resin is raised by the mechanism in the compression zone and the molten resin is in the starved state in the starvation zone.

9. The apparatus according to claim 1 further comprising an introducing speed adjusting container in which the physical foaming agent supplied from the physical foaming agent supply mechanism is warmed and from which the warmed physical foaming agent is introduced into the plasticizing cylinder via the introducing port.

10. The apparatus according to claim 9, wherein a volume of the introducing speed adjusting container is in a range of 5 mL to 10 L.

11. The apparatus according to claim 9, wherein the introducing speed adjusting container is provided with an expansion detecting mechanism which detects expansion of the molten resin from the introducing port.

* * * * *